United States Patent [19]

Bousquet et al.

[11] Patent Number: 5,025,341
[45] Date of Patent: Jun. 18, 1991

[54] THERMO-MAGNETIC RECORDING HEAD

[75] Inventors: Philippe Bousquet, Chatillon; Jean-Claude Lehureau, Ste-Genevieve-des-Bois, both of France

[73] Assignee: Thomson-Csf, Puteaux, France

[21] Appl. No.: 342,879

[22] Filed: Apr. 25, 1989

[30] Foreign Application Priority Data

Apr. 27, 1988 [FR] France .................................. 88 05593

[51] Int. Cl.$^5$ ............................................. G11B 5/235
[52] U.S. Cl. ..................................... 360/120; 360/115; 360/126
[58] Field of Search ............................. 360/119–120, 360/115, 125–126

[56] References Cited

U.S. PATENT DOCUMENTS 3,686,467  8/1972  Camras .
4,322,763  3/1982  Lemke .
4,652,957  3/1987  Schewe ............................ 360/125

FOREIGN PATENT DOCUMENTS 0218532   4/1987  European Pat. Off. .
770127    3/1957  United Kingdom .
882779   11/1961  United Kingdom .

Primary Examiner—A. J. Heinz
Attorney, Agent, or Firm—Oblon, Spivak, McClelland, Maier & Neustadt

[57] ABSTRACT

The thermo-magnetic head disclosed has a gap with magnetic properties at ambient temperature. This gap is heated above its Curie temperature in order to make it lose its magnetic property. The pole pieces on either side of the gap form electrical conductors which convey the heating current of this gap.

23 Claims, 3 Drawing Sheets

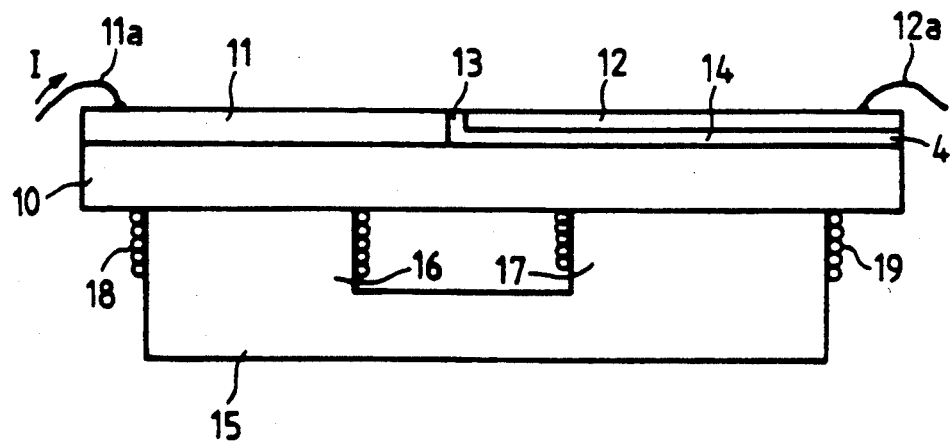
FIG_1
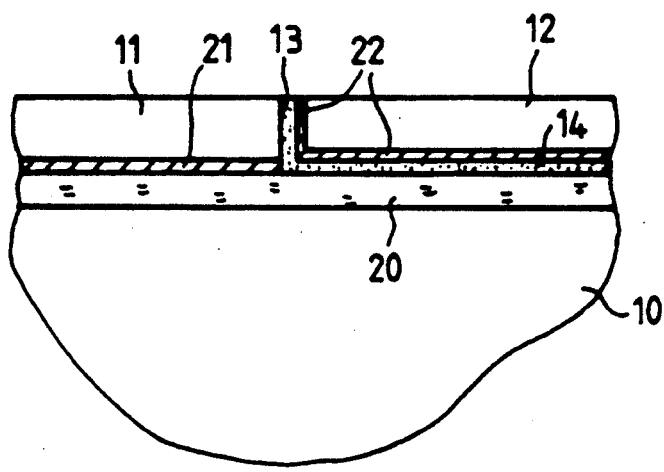
FIG_2

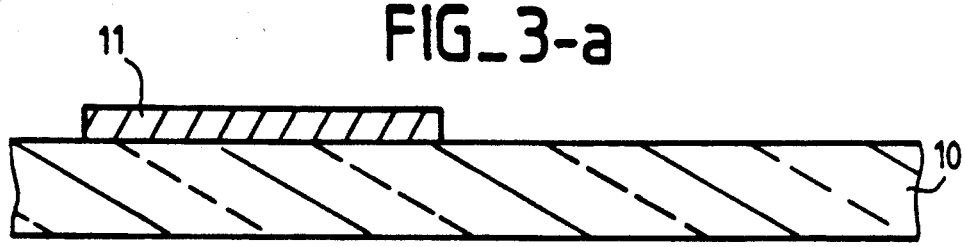
FIG_3-a
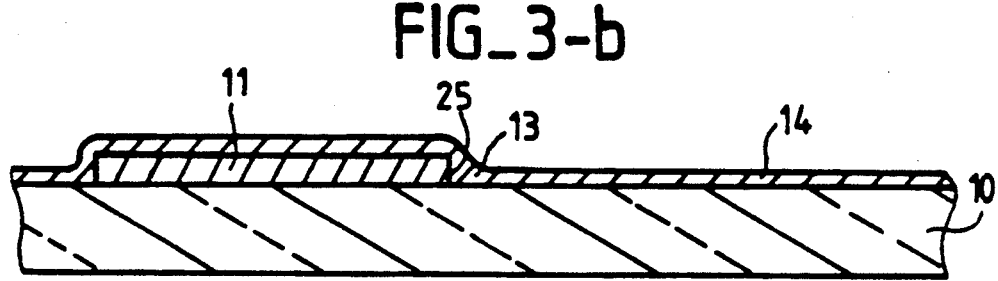
FIG_3-b
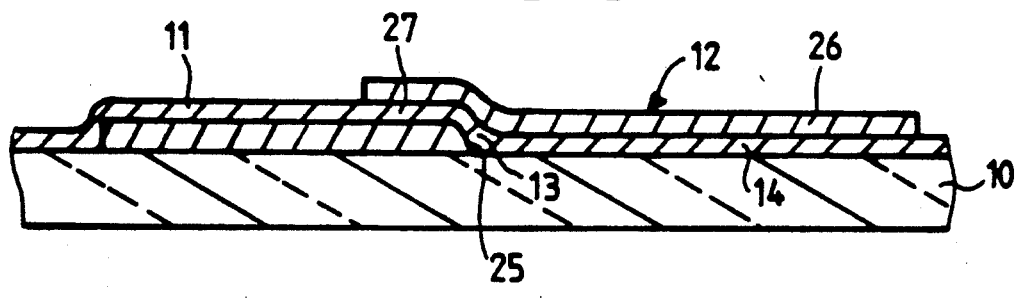
FIG_3-c
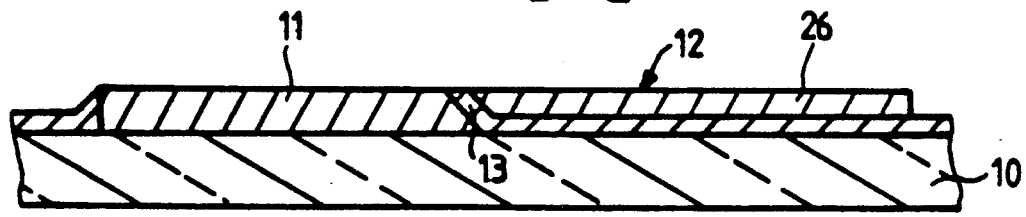
FIG_3-d

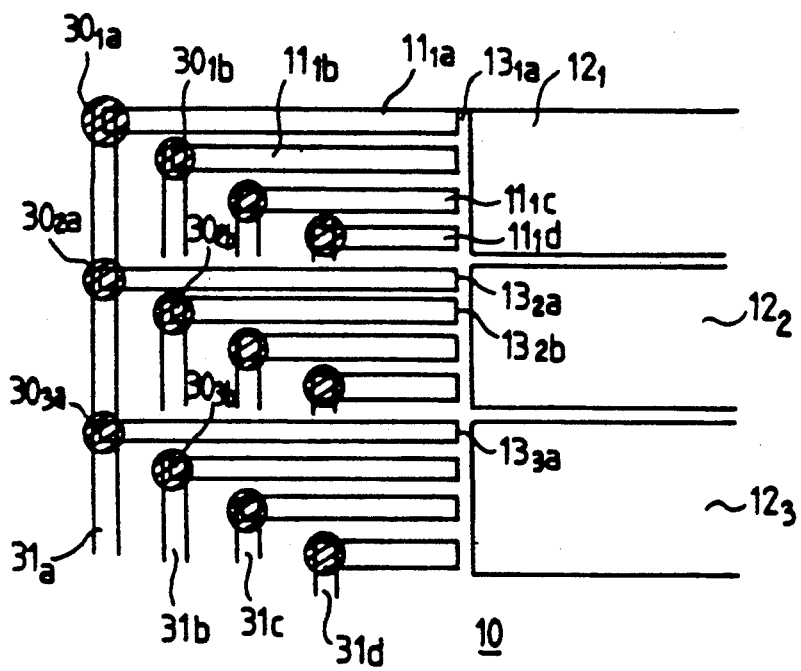
FIG_4
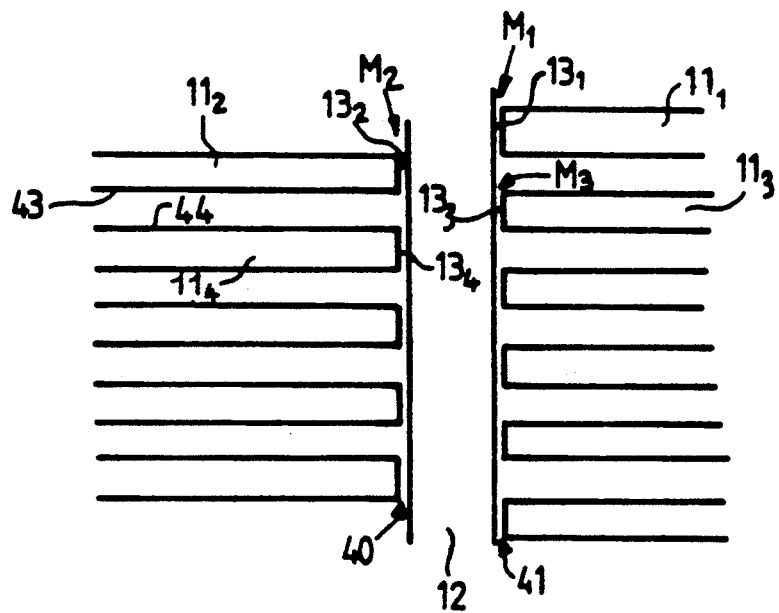
FIG_5

THERMO-MAGNETIC RECORDING HEAD

BACKGROUND OF THE INVENTION

1. Field of the Invention

The invention relates to a thermo-magnetic recording head.

The fast recording of items of information at great density on a magnetic medium, notably a tape, calls for compact magnetic recording heads with high speed of response.

2. Description of the Prior Art

The French patent No. 85 14766, filed by the applicant on Oct. 4, 1985, by the applicant, has already described a thermo-magnetic type of head which meets these conditions. This head has a magnetic substrate with moderate Curie temperature, i.e. little higher than ambient temperature, for example of the order of 100° C. The head also has two electrodes with a small distance between them. When a potential difference is applied between these two electrodes, a current flows through that part of the magnetic material which is located between the two electrodes. The current heats this part to above the Curie point. The material thus heated is then non-magnetic and from a gap, thus enabling items of information to be recorded on a magnetic medium.

The invention, which also concerns a thermo-magnetic type of head, enables improvement of great proportions in the density of information that can be recorded as well as in recording speed.

SUMMARY OF THE INVENTION

In the magnetic head according to the invention, the magnetic pole pieces on either side of the gap constitute electrical conductors conveying the heating current of this gap. The material of the pole pieces has both magnetic as well as electricity conducting properties. Preferably, the Curie temperature of the pole pieces is greater than the Curie temperature of the material of the gap. It is also preferable for the resistivity of the material of the gap to be greater than the resistivity of the material forming the pole pieces.

Since the gap is made of a material distinct from that of the pole pieces, its thickness is limited. This enables limiting the extent of the zone recorded on the magnetic medium and, therefore, promotes high density of information on this medium. Furthermore, when the pole pieces are themselves conductive, the making of the head can be very simple. Moreover, if the Curie point of the pole pieces is high, it is possible to obtain, at working temperature (of the order of the Curie temperature of the gap material), a high amplitude of magnetization of these pole pieces and, therefore, greater efficiency in the writing of items of information on the magnetic medium.

The material forming the pole pieces is, for example, an iron and nickel alloy known as PERMALLOY or an iron, silicon and aluminium alloy known as SENDUST or a cobalt and zirconium alloy. These pole pieces may also be made of pure iron with resistivity ranging between 10 and 100μ Ωcm. The Curie point of these materials ranges between about 200° C. and 400° C.

The gap layer is preferably formed by an iron oxide, for example, a ferrite of manganese, zinc and lithium. The magnetic saturation of an oxide of this type ranges between 2000 and 5000 Gauss at 20° C. and the Curie point ranges between 60° C. and 150° C. The resistivity of the material forming the gap may be adjusted by regulating the proportion between the divalent ions and the trivalent ions. It is thus possible to achieve resistivity ranging between 0.1 and 10 Ωcm.

The head is preferably made with thin layers, for example with the technique described in the French patent No. 86 14974 filed on behalf of the present applicant, which consists of the deposition, in thin layers, on a substrate, firstly of a first pole piece, then of the gap material in a layer with a thickness smaller than that of the first pole piece layer and then of the material of the second pole piece on the gap layer. Finally, the surface thus coated with three layers is polished so as to bare the gap itself. This technique enables a gap of very small width to be obtained, and thus enables optimizing the density of information recorded on the medium.

BRIEF DESCRIPTION OF THE DRAWINGS

Other features and advantages of the invention will emerge from the following description of some of its embodiments, said description being made with reference to the appended drawings, of which:

FIG. 1 is a sectional drawing of a magnetic head according to the invention;

FIG. 2 shows a partial sectional view of a head for a variant of FIG. 1;

FIGS. $3_a$ to $3_d$ illustrate a method for making a head according to FIG. 1;

FIG. 4 shows an assembly of magnetic heads according to the invention; and

FIG. 5 shows a view, similar to that of FIG. 4, but for a variant.

DESCRIPTION OF PREFERRED EMBODIMENT

In the example of FIG. 1, the substrate 10 is made of a non-magnetic material, for example silicon with a thickness of 300μ for example.

On this substrate 10, the main elements of the magnetic head, namely the two pole pieces 11 and 12 and the gap 13, are deposited in thin layers.

The thickness of the gap 13 is smaller than the thickness of the layer 11. This gap 13 forms a shoulder of a layer 14 interposed between the substrate 10 and the layer 12 forming the second pole piece. This sub-layer 14 results from the fabrication method which shall be described further below with reference to FIG. 3.

The layer 11 is connected to an electrical conductor $11_a$. Similarly, the layer 12 is connected to another electrical conductor $12_a$.

The magnetic circuit is closed, opposite the plate or "wafer" 10, by a magnet 15 with two arms 16 and 17, respectively facing poles 11 and 12. A reading or writing coil 18, 19, is wound on each of these arms.

The pole pieces 11 and 12 are made of a magnetic material with a high Curie point, higher than about 150° C. and having, at the same time, electricity conducting properties. Preferably, the resistivity ranges between 10 and 100 μΩcm. To make the layers 11 and 12, it is possible to use PERMALLOY consisting of about 20% of iron and 80% of nickel or SENDUST consisting of about 80% of iron, 10% of silicon and 10% of aluminium. It is also possible to use an alloy of about 95% of cobalt and 5% of zirconium. It is also possible to use pure iron.

The layer 14 is magnetic at ambient temperature. However its Curie point is lower than the Curie point of the material of the layers 11 and 12. Preferably, the Curie temperature of the material of this layer 14 (and hence of the gap 13) ranges between 60° C. and 150° C. Furthermore, the resistivity of this layer 14 is greater than the resistivity of the layers 11 and 12. In the example given, this resistivity ranges between 0.1 and 10 Ωcm. It consists of an iron oxide such as a ferrite of manganese, zinc and lithium having, as its cationic components about 40% of manganese, 50% of zinc and 10% of lithium. The magnetic saturation of an oxide of this type is of the order of 2000 to 5000 Gauss at 20° C.

In any case, the resistivity of the gap layer 13 may be adjusted by the choice of the proportions between divalent ions ($Fe^{++}$ or $Mn^{++}$ or $Zn^{++}$) and trivalent ions ($Fe^{+++}$).

An item of information is recorded by means of the magnetic head when a current is injected by the conductors $11_a$ and $12_a$ through the layers 11, 13 and 12 in order to heat the gap 13 so that it exceeds the Curie temperature and so that it thus loses its magnetic properties.

With a magnetic head of this type, it is not necessary to provide for means to address the coils 18 and 19. More precisely, to record items of information, the coils can be permanently supplied and the writing will be done only when an addressing current is conveyed by the conductors $11_a$ and $12_a$.

For high efficiency in the heating of the gap, it is preferable for the ratio between the resistivity of the material of the layer 13 and the resistivity of the material of the layers 11 and 12 to be greater than 10,000. Besides, it is preferable that the resistivity of the material of the layer 13 should not exceed 10 Ωcm to avoid breakdown. In effect, for an excessively low resistivity of the layer 13, the poles 11 and 12 may get excessively heated. For an excessive resistivity of this layer 13, the potential needed to produce the heating of this layer would produce an electric arc, or spark, through this gap, between the poles 11 and 12.

The variant shown in FIG. 2 is distinguished from that of FIG. 1 by the fact that, on the substrate 10, there is a layer 20 with thermal and electrical insulation properties and, between this layer 20 and the layer 11, there is a metallic layer 21. Between the gap layer 13, 14, and the layer 12, there is also placed another metallic layer 22. The metal forming the layers 21 and 22 is, for example, copper.

The layers 21 and 22 improve the conductivity of the current conveyed to the gap 13 to heat it. In one variant, the layers 11 and 12 are not conductive, the current being conveyed to the gap 13 to heat it solely through the metallic layers 21 and 22.

The cooling of the gap and the poles 11 and 12 is all the slower as the thermally and electrically insulating layer 20 is thick. In other words, it is possible to adjust the speed of response of the magnetic head, notably the time for which each signal is recorded, by adjusting the thickness of the layer 10.

For an applied electrical field of $2 \times 10^7$ volts/meter, a resistivity of $10^{-2}$ Ωm for the ferrite forming the layer 13, a specific mass of 5000 kg/m$^3$ for this ferrite, and a calorific capacity of 1.5 kilojoules/Kg° C. for this same ferrite, the Curie point of this layer 13 may be attained in a time of about 20 nanoseconds from the ambient temperature of 20° C. For the pole pieces 11 and 12 made of SENDUST, the head can be cooled in about 100 nanoseconds.

To record a point with a gap having a length of 5μ, a width of 0.4μ and a depth of 0.5μ, the energy needed is about 50 picojoules. Thus, a set of magnetic heads designed to record items of information at a frequency of one gigabit per second requires power with a value of just less than 1 watt for its addressing.

To make the head shown in FIG. 1, the procedure described below, with reference to FIGS. $3_a$ to $3_d$, is followed:

On the insulating wafer 10, there is deposited first of all the layer 11 (FIG. $3_a$) having both magnetic and electricity conducting properties.

Then, on the part 11 thus formed by photo-etching, there is deposited the layer 14 of gap material having magnetic properties with low Curie point. This deposition is made on that part of the wafer 10 which is not covered by the layer 11, as well as on the layer 11 itself so as to envelope at least one flank 25 of the layer 11. That part of the layer 14 that joins the part deposited directly on the wafer 10 and that part deposited on the layer 11 will form the gap 14 (FIG. $3_b$). The thickness of the layer 14 is smaller than that of the layer 11.

Then (FIG. $3_c$), a layer 26 of the same material as that of the layer 10 is deposited. This layer 26, which is designed to form the second pole piece 12 covers that part of the layer 14 which ends in the gap layer 13, this gap 13 as well as a fraction 27 of the layer 14 superimposed on the layer 11.

The gap 13 is bared (FIG. $3_d$) by the polishing of already superimposed layers. This polishing enables the removal of that part of the layer 14 which covers the layer 11, as well as that part of the layer 26 which was also above the layer 11.

This particularly simple method can be used to obtain a gap 13 of minimized width, said width being the thickness of the thin layer 14.

The magnetic head that we have just described with reference to FIGS. 1 to 3 can be used in a device comprising several such heads so as to enable fast recording of data on a magnetic medium. A device of this type is shown in FIG. 4.

In this example, the wafer 10 is made of a semiconducting material such as silicon wherein diodes 30 are formed. To these diodes, there are connected, firstly, current lead-in conductors 31 and, secondly, pole pieces 11 with magnetic and conductive properties as described above.

The pieces 11 are perpendicular to the current lead-in conductors 31.

The number of diodes 30 is equal to the number of magnetic heads. On the other hand, the number of conductors 31 is smaller because each conductor 31 is connected to several diodes. Thus, the conductor $31_a$ is connected to the diodes $30_{1a}$, $30_{2a}$ and $30_{3a}$. The conductor $30_{3b}$ which has been shown in three parts to make the drawing clearer, is connected to the diodes $30_{1b}$, $30_{2b}$ and $30_{3b}$.

The pole pieces $12_1$, $12_2$, $12_3$, . . . are common to several magnetic heads, four in the example. Thus, the pole piece $12_1$ is associated with the pieces $11_{1a}$, $11_{1b}$, $11_{1c}$ and $11_{1d}$.

In this way, a matrix type of addressing is performed for all the heads. As an example, a device with 2000 heads is associated with twenty input conductors 31 and 100 output pieces 12.

It is thus possible to simultaneously record items of information with 100 magnetic heads. For example, when a positive potential is applied to the conductor $31_a$ and a negative potential is applied to all the layers 12, the current flows through the gaps $13_{1a}$, $13_{2a}$, $13_{3a}$, etc. . . . , thus enabling these gaps to be heated and hence to exceed the Curie point.

It has to be noted that the heating of a gap causes a heating of the neighbouring gap by diffusion of heat, for example through the substrate (wafer 10). Of course, the parameters of the different materials, notably the thermal insulation characteristics of the wafer 10, are such that the temperature of this neighbouring gap stays below the Curie point. However, if this immediately neighbouring gap had been previously heated, there would have remained a considerable possibility that the slight heating by heat diffuion would cause a heating of this gap above the Curie point. This is why two neighbouring magnetic heads are not addressed successively. For example, when each piece 12 is associated with five magnetic heads, a current is made to pass through the heads of the heads of following successive ranks, and in this order: 1, 3, 5, 2, 4.

In one variant, the diodes 30 are done away with, and the gaps 13 play the role of these diodes. To this effect, the material of the gap is a conductor with a negative temperature coefficient (NTC). Thus, when the temperature of the gap 13 is high enough, the gap is appreciably more conductive than at the ambient temperature. In other words, the current then flows preferentially through the heads to be addressed rather than through the non-addressed heads. For the gap to have this NTC conducting property, it is made, for example, as described above, of ferrite of manganese, zinc and lithium.

In another embodiment (FIG. 5), the magnetic heads $M_1$, $M_2$, $M_3$ etc. are assembled in such a way that the pitch between two neighbouring tracks, recorded on a magnetic medium, can be minimized. To this effect, the gaps $13_1$, $13_2$, $13_3$, $13_4$, etc. are placed quincunxially along two parallel lines 40 and 41. More precisely, the pole pieces $11_1$, $11_2$, $1_3$ etc. have the width of a track to be recorded on a magnetic medium, and they are assembled in groups of two sets of parallel strips, one to the left of the row 40 and the other to the right of the row 41. Between these rows 40 and 41, there is provision for a common pole piece 12. The parallel edges closest to the strips 11 of the same set, for example the edges 43 and 44 of the strips $11_2$ and $11_4$, are separated by a distance equal to the width of each strip. This interval between the edges 43 and 44 is occupied, but on the other side of the part 12, by a strip $11_3$ of the second set.

What is claimed is:

1. A magnetic head comprising:
   a gap of a first material with magnetic properties at ambient temperature;
   heating means to heat the material of the gap beyond the Curie temperature in order to make said gap material lose its magnetic properties; and
   magnetic pole pieces of a second material on each side of the gap said pieces forming electrical conductors for conveying heating current to heat the gap material.

2. A magnetic head according to claim 1, wherein the Curie temperature of the second material of the pole pieces is greater than the Curie temperature of the gap material.

3. A magnetic head according to claim 1 or 2, wherein the resistivity of the material of the gap is greater than the resistivity of the second material of the pole pieces.

4. A magnetic head according to claim 3, wherein the ratio between the resistivity of the material of the gap and the resistivity of the material of the pole pieces is greater than 10,000.

5. A magnetic head according to any one of the claims 1, 2 or 3, wherein the resistivity of the pole pieces ranges between 10 and 100 $\mu\Omega$cm.

6. A magnetic head according to any one of the claims 1, 2, or 3, wherein the resistivity of the material of the gap is 10 $\Omega$cm at the most.

7. A magnetic head according to claim 6, wherein the resistivity of the material of the gap is greater than 0.1 $\Omega$cm.

8. A magnetic head according to claim 1, wherein the material forming the pole pieces is chosen from the following groups: iron and nickel alloy, iron, silicon and aluminium alloy, cobalt and zirconium alloy, and pure iron.

9. A magnetic head according to claim 1, wherein the material forming the gap is an iron oxide.

10. A magnetic head according to claim 9, wherein the material forming the gap is a ferrite of manganese, zinc and lithium.

11. A magnetic head according to any one of the claims 1, 2 or 3, wherein the Curie temperature of the material of this gap ranges between 60° and 150° C.

12. A magnetic head according to any one of the claims 1, 2 or 3, wherein the pole pieces and the gap are deposited in thin layers on a substrate.

13. A magnetic head according to claim 12, wherein each pole piece ia associated with a conductive metallic layer.

14. A magnetic head according to claim 13, wherein the metallic layers are interposed between the layers of pole pieces and the substrate.

15. A magnetic head according to claim 12, wherein an electrically insulating and thermally insulating layer is interposed between the substrate and the layers of pole pieces and of the gap.

16. A magnetic head according to claim 12, wherein the gap layer forms the shoulder of a layer with a thickness smaller than an adjacent pole piece layer, and on which there is deposited the second pole piece.

17. A magnetic head according to any one of the claims 1, 2 or 3, wherein the material forming the gap has a resistivity which gets lower when the temperature increases so as to show a characteristic of negative resistance (NTC).

18. A magnetic head according to claim 17, wherein the gap material is an iron oxide, notably a ferrite of manganes, zinc and lithium.

19. A magnetic head according to claim 1, wherein the Curie temperature of the pole pieces ranges between 200° C. and 400° C.

20. A magnetic head having two pole pieces of thin layers of first and second thicknesses wherein said pole pieces are separated by gap of a first material, wherein the gap material is extended to form a shoulder layer on which there is deposited one of said two pole piece thin layers having a first thickness, said gap shoulder layer having a thickness less than the thickness of the other one of said pole piece layers having said second thickness and wherein said gap material is a material which is magnetic at ambient temperature, said magnetic head further including a heating means for heating the gap material to a temperature above the Curie point in order to make said gap material lose its magnetic properties.

21. A device comprising several magnetic heads according to any one of the claims 1, 2, 3 or 20 wherein the gaps are arranged in a row and wherein means are provided to sequentially heat the heads in groups of several elements, the sequence being such that two neighbouring heads are not heated successively.

22. A device comprising several magnetic heads according to any of the claims 1, 2, 3 or 20, wherein these magnetic heads have a common pole piece on either side of which are placed, quincunxially, the second pole pieces of the various heads.

23. A device according to claim 22, wherein the second pole pieces of the heads are in the form of parallel strips of the same width, the strips located on one and the same side of the common pole piece being separated by an interval with a width equal to the width of each strip.

* * * * *